(12) United States Patent
Chae et al.

(10) Patent No.: US 12,351,525 B2
(45) Date of Patent: Jul. 8, 2025

(54) METHOD FOR MANUFACTURING CERAMIC HEATER

(71) Applicant: MICO CERAMICS LTD., Anseong (KR)

(72) Inventors: Je Ho Chae, Pyeongtaek (KR); Chang Hee Lee, Pyeongtaek (KR); Jung Hoon Jeong, Anseong (KR)

(73) Assignee: MICO CERAMICS LTD., Anseong (KR)

( * ) Notice: Subject to any disclaimer, the term of this patent is extended or adjusted under 35 U.S.C. 154(b) by 649 days.

(21) Appl. No.: 17/205,976

(22) Filed: Mar. 18, 2021

(65) Prior Publication Data

US 2021/0387922 A1 Dec. 16, 2021

(30) Foreign Application Priority Data

Jun. 10, 2020 (KR) ........................ 10-2020-0070257

(51) Int. Cl.
 *H05B 3/14* (2006.01)
 *C04B 35/645* (2006.01)
 *C04B 37/02* (2006.01)

(52) U.S. Cl.
 CPC .......... *C04B 37/021* (2013.01); *C04B 35/645* (2013.01); *H05B 3/141* (2013.01); *C04B 2237/68* (2013.01)

(58) Field of Classification Search
 CPC . C04B 37/021; C04B 35/645; C04B 2237/68; C04B 2235/3225; C04B 2237/34; C04B 2237/341; C04B 2237/343; C04B 2237/346; C04B 2237/348; C04B 2237/36; C04B 2237/361; C04B 2237/365; C04B 2237/366; H05B 3/141; H05B 3/283; H05B 1/0233; H05B 3/03; H05B 3/18; H05B 3/688; H05B 2203/017; B28B 3/025; B28B 13/022; B32B 18/00; H01L 21/67103; H01L 21/68714; C23C 16/4586; H01J 37/32724
 See application file for complete search history.

(56) References Cited

U.S. PATENT DOCUMENTS 7,655,180 B2 * 2/2010 Takeuchi .............. C04B 35/584
 264/650
2005/0045618 A1 3/2005 Ito
 (Continued)

FOREIGN PATENT DOCUMENTS

JP 11255566 A * 9/1999
JP 2006005095 A 1/2006
 (Continued)

*Primary Examiner* — Tiffany T Tran

(57) ABSTRACT

The present disclosure relates to a method for manufacturing a ceramic heater. The method for manufacturing a ceramic heater according to the present disclosure comprises: separately charging a ceramic powder into a center portion and multiple split edge portions in a formation mold and leveling the charged ceramic powder; manufacturing a molded body or pre-sintered body of the ceramic powder from the leveled ceramic powder; disposing a high-frequency electrode or a heating element on the molded body or pre-sintered body of the ceramic powder and filling a second ceramic powder; and integrally sintering the molded body or pre-sintered body of the ceramic powder and the second ceramic powder.

9 Claims, 11 Drawing Sheets

(56) References Cited

U.S. PATENT DOCUMENTS

| | | | |
|---|---|---|---|
| 2005/0056976 A1* | 3/2005 | Matsuda | H01L 21/67103 264/618 |
| 2006/0011610 A1 | 1/2006 | Kondou et al. | |
| 2006/0209490 A1* | 9/2006 | Nakamura | H01L 21/6831 361/234 |
| 2020/0094322 A1* | 3/2020 | Van Rooyen | F28F 7/02 |
| 2020/0338827 A1* | 10/2020 | Eguchi | B23K 11/0013 |

FOREIGN PATENT DOCUMENTS

| | | | |
|---|---|---|---|
| JP | 5056029 B2 | | 10/2012 |
| KR | 1020030072324 A | | 9/2003 |
| KR | 1020050018599 A | | 2/2005 |
| KR | 20120019605 A | * | 8/2010 |
| KR | 1020120019605 A | | 3/2012 |
| KR | 1020130056416 A | | 5/2013 |
| KR | 1020200045095 A | | 5/2020 |

\* cited by examiner

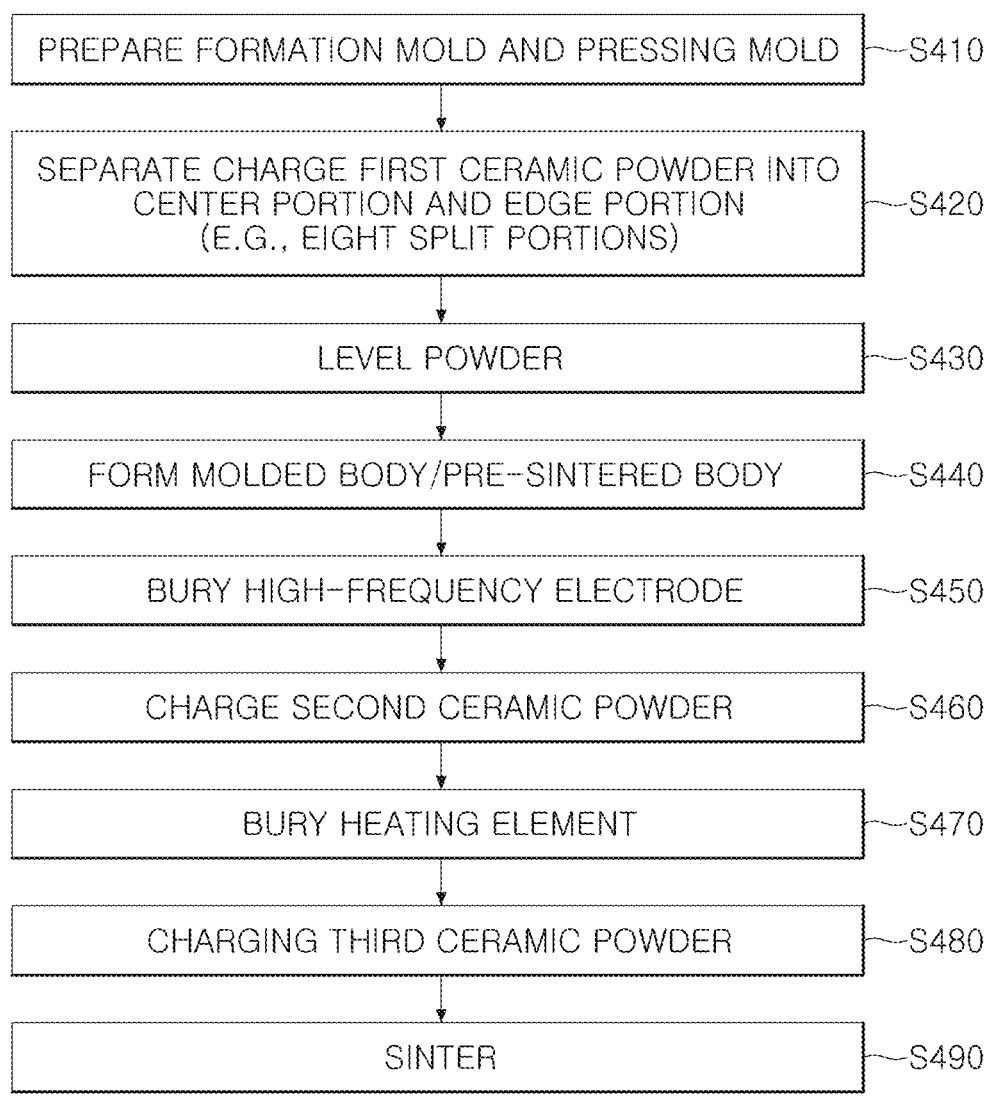

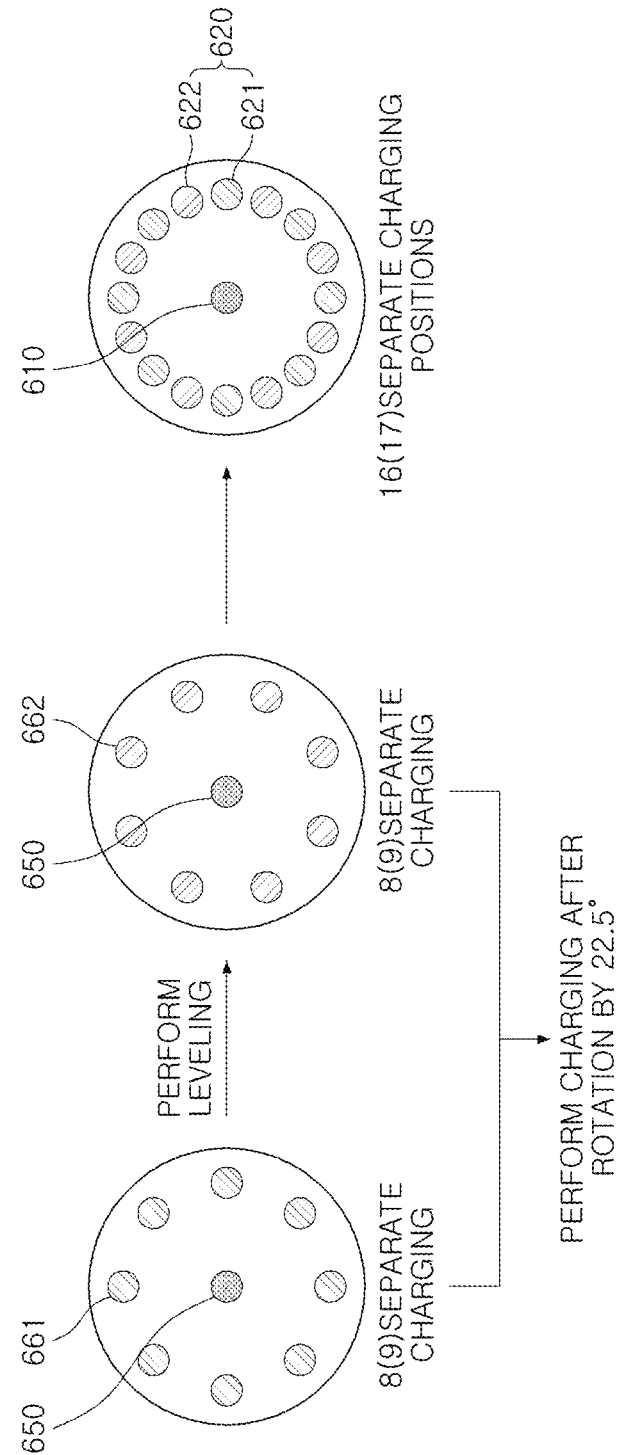

METHOD FOR MANUFACTURING CERAMIC HEATER

BACKGROUND OF THE INVENTION

1. Field of the Invention

The present disclosure relates to a method for manufacturing a ceramic heater and, more particularly, to a method for manufacturing a ceramic heater, wherein the sectional shape of a high-frequency electrode can be easily manufactured in a shape different from that of a heating element.

2. Description of the Prior Art

In general, a semiconductor device or a display device is manufactured by successively laminating multiple thin-film layers including a dielectric layer and a metal layer onto a glass substrate, a flexible substrate, or a semiconductor wafer substrate, and then patterning the same. These thin-film layers are successively deposited onto the substrate through a chemical vapor deposition (CVD) process or a physical vapor deposition (PVD) process. Examples of the CVD process includes a low-pressure CVD (LPCVD) process, a plasma-enhanced CVD (PECVD) process, a metal organic CVD (MOCVD) process, and the like.

Such CVD devices and PVD devices are equipped with heaters for supporting glass substrates, flexible substrates, semiconductor wafer substrates, and the like and applying predetermined heat thereto. Such heaters are also used to heat substrates during processes for etching thin-film layers formed on support substrates, photoresist sintering processes, and the like. Ceramic heaters are widely used for the CVD devices and PVD devices in line with requirements such as accurate temperature control, semiconductor element wires that become smaller, and precise heat treatment of semiconductor wafer substrates.

As illustrated in FIG. 1, a conventional ceramic heater 1 includes a ceramic body 10 coupled to a support portion 20. The ceramic body 10 is manufactured by stacking a high-frequency electrode 11 and a heating element 13 between ceramic powder inside a heater-manufacturing mold. The support portion 20 provides holes such that rods 21 and 22 extend therethrough and are connected to the high-frequency electrode 11 and the heating element 13, respectively, thereby supplying power.

The high-frequency electrode 11 is commonly manufactured to be flat, as in the case of FIG. 2A, such that an even plasma occurs during a PECVD process. The heating element 13 may also be manufactured to be flat. However, there is a problem in that, if ceramic powder is not evenly charged at the center part and edge part during pressurized sintering inside a heater-manufacturing mold, the wire mesh-type high-frequency electrode 11 inevitably bends and comes to have a curved shape (not a flat shape).

If necessary, the center part of the high-frequency electrode 11 needs to be manufactured to be lower than the periphery, as in the case of FIG. 2A or 2B. In such a case, there is a need for a process of additionally laminating a boron nitride (BN) ceramic layer on the heater-manufacturing mold, in which the high-frequency electrode 11 and the heating element 13 are inserted into a molded body or a pre-sintered body, and heat-treating the same. This poses a problem in that the manufactured high-frequency electrode 11 and heating element 13 both are bent to be downwardly or upwardly convex.

SUMMARY OF THE INVENTION

Accordingly, the present disclosure has been made to solve the above-mentioned problems, and it is an aspect of the present disclosure to provide a method for manufacturing a ceramic heater, wherein a high-frequency electrode can be easily manufactured in the same flat sectional shape (shape) as that of a heating element, or only the high-frequency electrode can be easily manufactured to have a sectional shape which is bent to be downwardly convex (V/U shape) or upwardly convex (reverse V/U shape).

To summarize characteristics of the present disclosure, a method for manufacturing a ceramic heater according to an aspect of the present disclosure includes: (a) separately charging a ceramic powder into a center portion and multiple split edge portions in a formation mold and leveling the charged ceramic powder; (b) manufacturing a molded body or pre-sintered body of the ceramic powder from the leveled ceramic powder; (c) disposing a high-frequency electrode or a heating element on the molded body or pre-sintered body of the ceramic powder and filling a second ceramic powder; and (d) integrally sintering the molded body or pre-sintered body of the ceramic powder and the second ceramic powder.

The center portion is a region having a predetermined radius from a center point, and the multiple split edge portions include four or more split edge portions disposed on a circumference which is in contact with the center portion.

Operation (a) is repeated, and a powder-charging position of each of the multiple split edge portions is a position resulting from rotation about the center portion by a predetermined angle.

Operation (a) includes charging the center portion with the ceramic powder to a first weight and then charging each of the multiple split edge portions with the ceramic powder to a second weight.

Operation (a) includes charging each of the multiple split edge portions with the ceramic powder to the second weight and then charging the center portion with the ceramic powder to the first weight.

The first weight and the second weight are predetermined in order to form a flat cross-section or an upwardly or downwardly convex cross-section of the high-frequency electrode disposed in the second ceramic powder on the molded body or pre-sintered body of the ceramic powder in the ceramic heater.

Operation (c) includes: disposing a high-frequency electrode on the molded body or pre-sintered body of the ceramic powder; charging an electrode-on first ceramic powder onto the high-frequency electrode; disposing a heating element on the electrode-on first ceramic powder charged on the electrode; charging an electrode-on second ceramic powder onto the heating element; and performing press sintering.

The charging of the electrode-on second ceramic powder comprises separately charging the center portion and the multiple split edge portions in the formation mold with the electrode-on second ceramic powder in order to form a flat cross-section or an upwardly or downwardly convex cross-section of the heating element in the ceramic heater.

A ceramic heater according to another aspect of the present disclosure includes a first ceramic sintered body and a second ceramic sintered body, which are in contact with and integrated with each other, and further includes a heating element and a high-frequency electrode, disposed in the second ceramic sintered body, wherein the first ceramic sintered body and the second ceramic sintered body are formed by sintering an intermediate body of a ceramic powder for the first ceramic sintered body, and a ceramic powder for the second ceramic sintered body, and wherein the intermediate body is formed by: separately charging the ceramic powder for the first ceramic sintered body into a center portion and multiple split edge portions in a formation mold; and leveling the ceramic powder.

A method for manufacturing a ceramic heater according to the present disclosure is advantageous as follows: it is possible to separately charge and then press-sinter a ceramic powder at the time of forming a molded body or pre-sintered body in a heater manufacturing mold to improve the uniformity of filling density depending on the position, thereby preventing a high-frequency electrode from being bent. This may be used to manufacture a high-frequency electrode to have the same flat shape (shape) as that of a heating element. In addition, depending on the design purpose, when only the high-frequency electrode is manufactured to have a sectional shape which is a downwardly convex shape (V/U shape) or an upwardly convex shape (reverse V/U shape), a ceramic powder is charged, at the time of forming a molded body or pre-sintered body, into a center portion and split edge portions (e.g., an edge portion is split into 4, 8, or 16 equal portions) to make ceramic powder filling densities different, and thus the high-frequency electrode having the corresponding shape is easily provided.

Such a method for manufacturing a ceramic heater enables the shape of the high-frequency electrode to be easily designed and manufactured without precise processing (or with minimum processing) when forming a molded body (or a pre-sintered body) disposed below the high-frequency electrode in the formation mold. Further, in forming the heating element, a flat shape (shape), a downwardly convex shape (V/U shape), or an upwardly convex shape (reverse V/U shape) thereof can also be easily realized by applying the method for forming the high-frequency electrode thereof.

BRIEF DESCRIPTION OF THE DRAWINGS

The accompanying drawings, which are included as a part of the detailed description in order to help understand the present disclosure, provide an embodiment of the present disclosure, and, together with the detailed description, illustrate the technical idea of the present disclosure.

FIG. 4 is a flowchart for describing a process of manufacturing a ceramic heater according to an embodiment of the present disclosure;

FIG. 6 is a view for describing an example of use of a jig for the ceramic powder charging in FIGS. 5A and 5C;

DETAILED DESCRIPTION OF THE EXEMPLARY EMBODIMENTS

Hereinafter, the present disclosure will be described in detail with reference to the accompanying drawings. In the accompanying drawings, the same or like elements will be designated by the same or like reference signs as much as possible. Further, a detailed description of known functions and/or configurations will be omitted. The following description of the present disclosure is mainly directed to the parts required to understand operations according to various embodiments, and a description of elements that may make the subject matter of the present disclosure unclear will be omitted. In the accompanying drawings, some elements may be exaggerated, omitted, or schematically illustrated. Further, the size of each element does not completely reflect the actual size, and thus the present disclosure is not limited by the relative sizes and distances of elements illustrated in the respective drawings.

In the following description of the present disclosure, a detailed description of known functions or configurations incorporated herein will be omitted when it may make the subject matter of the present disclosure rather unclear. The terms which will be described below are terms defined in consideration of the functions in the present disclosure, and may be different according to users, intentions of the users, or customs. Therefore, the definitions of the terms should be made based on the contents throughout the specification. The terms used in the detailed description are only used to describe embodiments of the present disclosure, and are not intended to limit the present disclosure. A singular expression may include a plural expression unless they are definitely different in a context. As used herein, such expression as "include" or "have" is used to refer to certain features, numerals, steps, operations, elements, a part or combination thereof, and should not be construed to exclude the existence or possibility of one or more other features, numerals, steps, operations, elements, a part or combination thereof.

Further, such terms as "a first" and "a second" may be used to describe various elements, but the corresponding elements are not limited by these terms. These expressions are used only for the purpose of distinguishing between one element and any other element.

Figure 1:
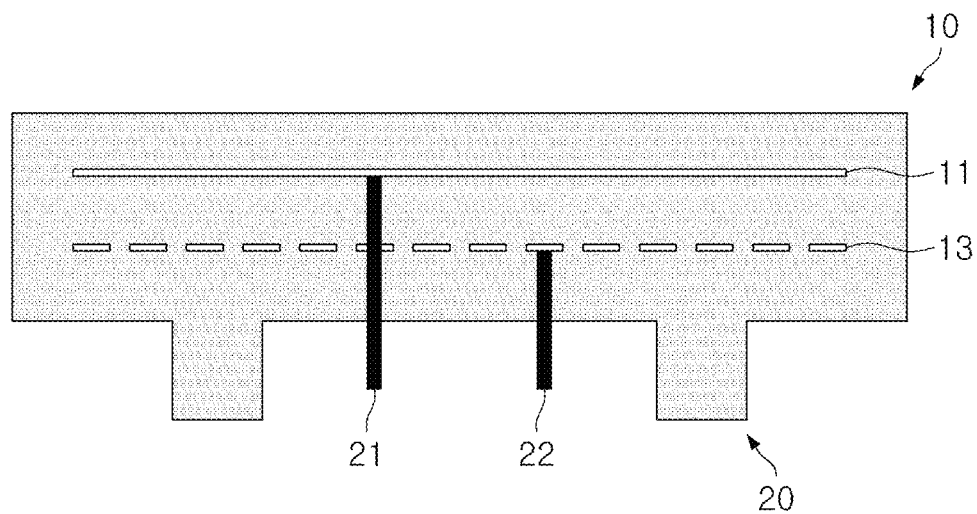
FIG. 1 is a view for describing the structure of a conventional ceramic heater.
Figure 2A:
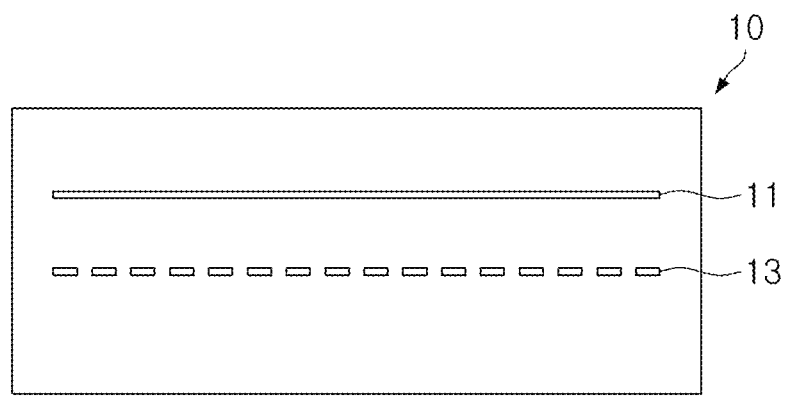
FIGS. 2A, 2B and 2C illustrates examples of the shapes of a heating body and a high-frequency electrode in a conventional ceramic heater.
Figure 2B:
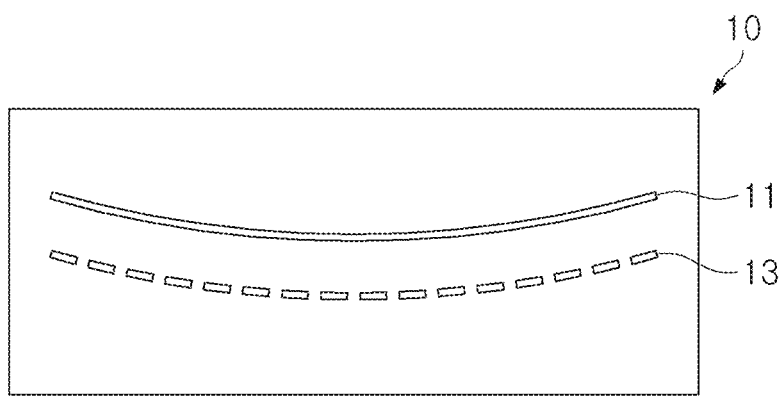
Figure 2C:
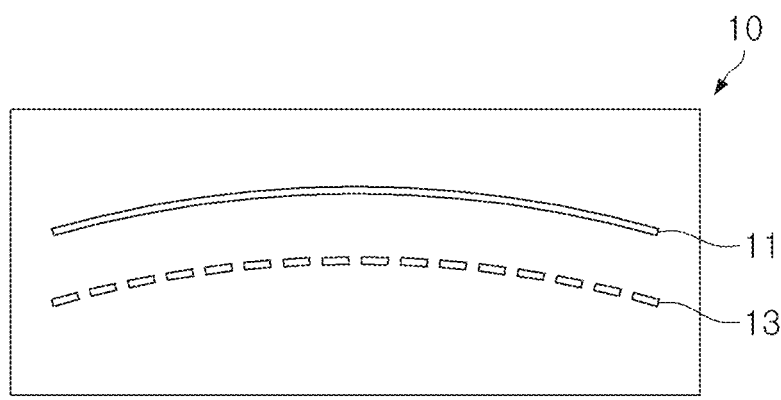
Figure 3:
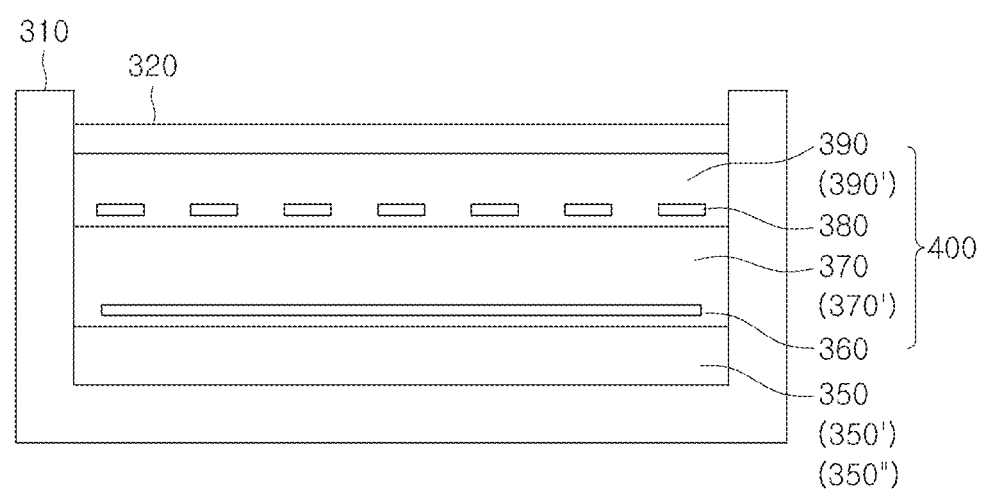
FIG. 3 is a view for describing a laminated structure formed in the process of manufacturing a ceramic heater according to an embodiment of the present disclosure.

FIG. 3 is a view for describing a laminated structure formed in the process of manufacturing a ceramic heater according to an embodiment of the present disclosure.

Referring to FIG. 3, in order to manufacture a ceramic heater according to an embodiment of the present disclosure, first, the inside of a formation mold 310 is divided into a center portion and multiple split edge portions (see FIGS. 5A and 5C) and is charged with a first ceramic powder 350", the charged first ceramic powder 350" is leveled, and then an intermediate body 350', that is, a molded body or a pre-sintered body formed in a predetermined heat treatment process is formed. Subsequently, a high-frequency electrode 360 and a heating element 380 are buried (or placed) in ceramic materials 370' and 390', which are other ceramic powders, on the molded body or pre-sintered body 350' of the first ceramic powder 350", and are then integrally press-sintered.

Hereinafter, in an embodiment of the present disclosure, a description will be made of a method for manufacturing a ceramic heater by burying the high-frequency electrode 360 and the heating element 380 in ceramic materials 370' and 390' on the molded body or pre-sintered body 350' of the first ceramic powder 350". However, the method may also be applied to the case in which only one of the high-frequency electrode 360 and the heating element 380 is buried, with the exception that a ceramic powder is charged only once on the molded body or pre-sintered body 350' of the first ceramic powder 350", and other methods may also be similarly applied thereto.

Figure 7A:
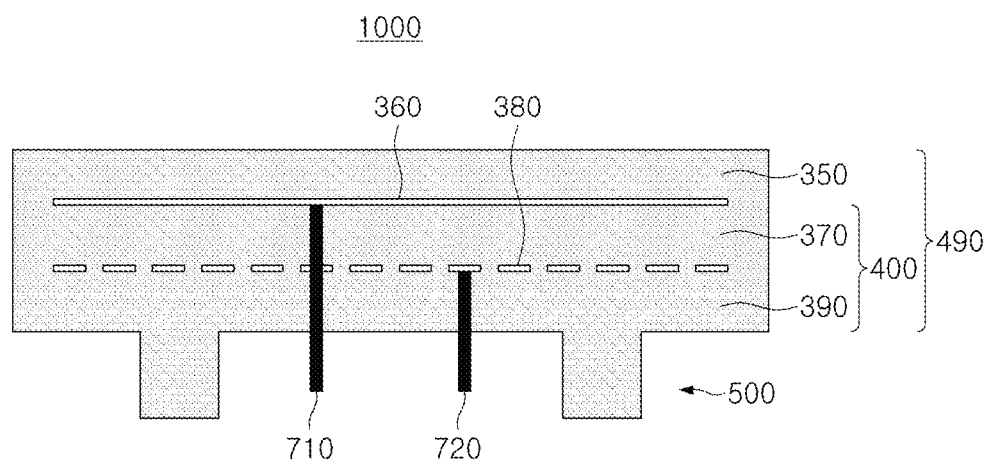
FIGS. 7A, 7B and 7C are cross-sectional views of a ceramic heaters manufactured by a manufacturing method of the present disclosure.
Figure 7B:
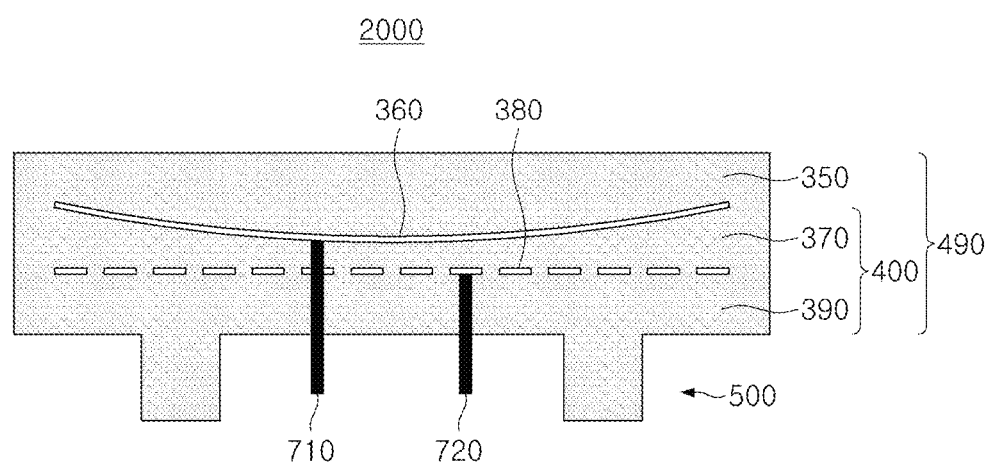
Figure 7C:
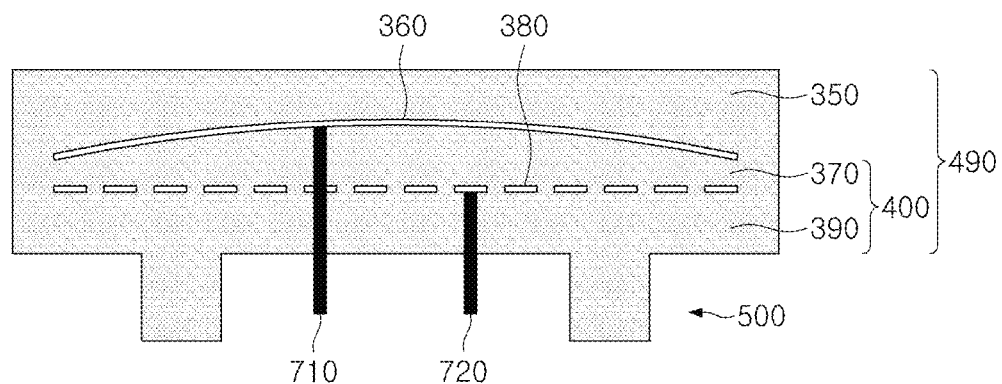

As described above, the ceramic heater manufactured by the manufacturing method of the present disclosure is formed in a structure in which a first ceramic sintered body 350, which is a sintered body of the first ceramic powder 350", is in contact with and integrated with a second ceramic sintered body 400 including sintered bodies 370 and 390 of the ceramic materials 370' and 390'. The ceramic heater includes the high-frequency electrode 360 and the heating element 380 buried in the second ceramic sintered body 400. The above-described structure of the ceramic heater will be described in greater detail when a description regarding FIGS. 7A to 7C is made below.

Hereinafter, a process of manufacturing a ceramic heater and the structures of ceramic heaters according to an embodiment of the present disclosure will be described in greater detail with reference to FIGS. 4 to 9A, 9B and 9C.

FIG. 4 is a flowchart for describing a process of manufacturing a ceramic heater according to an embodiment of the present disclosure.

Referring to FIG. 4, in order to manufacture a ceramic heater according to an embodiment of the present disclosure, first, a formation mold 310, corresponding to the overall shape of a heater body part constituting the ceramic heater, and a pressing mold 320, configured to apply pressure to the ceramic powder charged (or filled) in the formation mold 310, may be provided (S410).

The inside of the formation mold 310 is divided into a center portion (see reference numeral 610 in FIG. 6) and multiple split edge portions (see reference numeral 620 in FIG. 6) (see FIGS. 5A and 5C), and is charged with the first ceramic powder 350" (S420). The charged first ceramic powder 350" is leveled (S430), and then an intermediate body 350', that is, a molded body or a pre-sintered body formed by predetermined heat treatment is formed (S440). If necessary, in order to form the molded body or the pre-sintered body, pressing may be performed using the pressing mold 320. The molded body may be formed by pressing without any heat treatment, and the pre-sintered body may be obtained by temporarily performing sintering at a pressure and a heat-treatment temperature condition configured to be respectively equal to or lower than a pressure and a heat-treatment temperature for final compression sintering in operation S490.

In operation S420, the center portion 610 is a region having a predetermined radius from the center point in the formation mold 310 having a hollow cylindrical shape, a hollow hexahedral shape, etc. (see the ceramic powder with which a cylindrical center portion is charged, in FIGS. 5A and 5C). Herein, the multiple split edge portions 620 on the circumference include split portions which have a flower shape or a sector-shape and are in contact with each other from the center portion 610 toward the edge, and may include N (natural number equal to or greater than 2) split edge portions. The number of multiple split edge portions 620 may be odd or even. For example, the multiple split edge portions 620 may be four or more split edge portions (four split edge portions, eight split edge portions, or 16 split edge portions).

In operation S420, in relation to the order of charging the first ceramic powder 350", it may be desirable for the center portion 610 to first be charged with the first ceramic powder 350" to a predetermined first weight, and then each of the remaining multiple split edges 620 is charged with the first ceramic powder 350" to a predetermined second weight. However, if necessary, in the reverse order, it is possible to charge each of the multiple split edge portions 620 with the first ceramic powder 350" to the second weight, and then charge the center portion 610 with the first ceramic powder 350" to the first weight. A jig for charging the first ceramic powder 350" may have a shape having holes corresponding to the center portion 610 and the multiple split edge portions 620.

As is more specifically described below, in the ceramic heater of the present disclosure, the first weight and the second weight are predetermined in order to form a flat cross-section or upwardly or downwardly convex cross-section of the high-frequency electrode 360 buried (or placed) in the ceramic materials 370' and 390' on the molded body or the pre-sintered body 350' of the first ceramic powder 350".

In operation S430, the charged first ceramic powder 350" may be leveled, for example, by pressing the charged powder ceramic by using an instrument such as a separate press. Further, in another method, the first ceramic powder 350" may be leveled by shaking the formation mold 310, which is charged with the first ceramic powder 350", in a direction parallel to the ground. Further, the first ceramic powder 350" may be leveled by vertically moving a member rotating on the first ceramic powder 350" in the formation mold 310.

In operation S420, when the multiple split edge portions 620 are formed as four split edge portions, eight split edge portions, 16 split edge portions or the like, the multiple split edge portions 620 may be simultaneously charged with the first ceramic powder 350". In particular, when there are many split portions (e.g., 16 split edge portions, etc.), the multiple split edge portions 620 may be distinguished based on the positions thereof, and charging of all thereof may be carried out in two or more steps.

Figure 5A:
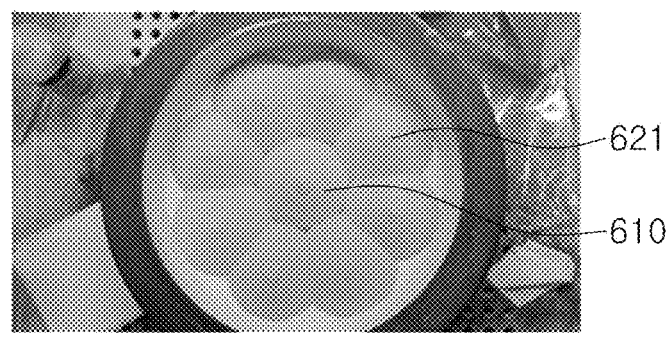
FIGS. 5A, 5B and 5C show photographs regarding an example of charging of a ceramic powder in a process of manufacturing a ceramic heater according to an embodiment of the present disclosure.
Figure 5B:
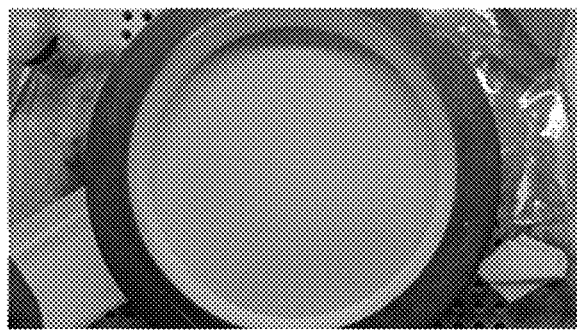
Figure 5C:
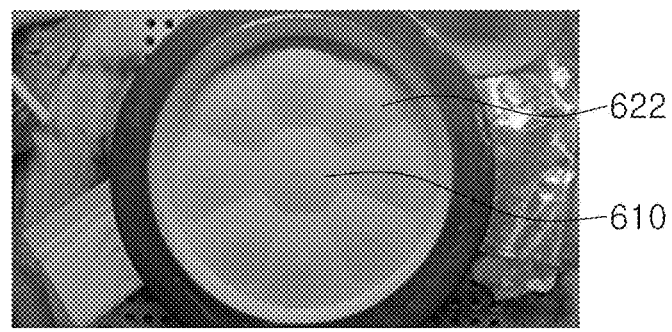

FIG. 5 shows photographs regarding an example of charging of the first ceramic powder 350" in a process of manufacturing a ceramic heater according to an embodiment of the present disclosure. Photograph of FIG. 5A shows primary powder charging, photograph of FIG. 5B shows leveling, and photograph of FIG. 5C shows secondary powder charging at different alternate positions.

FIG. 6 is a view for describing an example of the use of a jig for charging the first ceramic powder 350" in FIG. 5. A left image in FIG. 6 shows one center hole position 650 and eight edge-portion holes positions 661 of the jig, angularly spaced apart by 45° in the circumferential direction, during primary charging of the first ceramic powder 350", a center image in FIG. 6 show one center hole position 650 and eight edge-portion hole positions 662 of the jig during secondary charging of a ceramic powder when the jig is rotated by 22.5°, and a right image in FIG. 6 shows a total of 16 separate chargings, including the primary and secondary charging of the first ceramic powder 350" at the eight edge-portion hole positions 661 and the eight edge-portion hole positions 662 of the jig, and the charging of the first ceramic powder 350" into the center portion 610 of the formation mold 310 at the center hole position of the jig.

Referring to FIGS. 5 and 6, in operation S420, when the first ceramic powder 350" is charged into the multiple split edge portions 620, for example, 16 split edge portions, the multiple split edge portions are distinguished according to the positions thereof, and the first ceramic powder 350" may be repeatedly charged into split edge portions 621 at eight hole position and edge portions 622 at the remaining eight hole positions in two steps. The angles between the centers of the edge portions 621 and the centers of the edge portions 622 are 22.5°. In the case of the 16 split edge portions 620, a method of repeatedly performing charging in two steps is described, but the charging method is not limited thereto. With respect to multiple split edge portions, repeated charging, the number of times of which is 2, 3, 4, 5, . . . , etc. (M times, M is a natural number equal to or greater than 2) is possible. At this time, the jig is rotated by an angle corresponding thereto (e.g., 22.5° in the case of 16 split edge portions), and charging is repeated at different positions at which the edge portion centers is located.

To this end, first, as illustrated in the left image of FIG. 6, a jig having eight holes spaced 45° apart from each other is placed in the formation mold 310, and as shown in photograph of FIG. 5A, the edge portions 621 among the 16 split edge portions 620 and the center portion 610 are charged with a ceramic powder to a predetermined weight as described above. Subsequently, the ceramic powder is leveled as shown in photograph of FIG. 5B. Again, charging and leveling of the first ceramic powder 350" are repeated at a powder-charging position resulting from rotating the jig about the center portion 610 by a predetermined angle (e.g., 22.5° in the case of 16 split edge portions). That is, the jig is rotated by 22.5° as shown in the center image of FIG. 6 and then placed in the formation mold 310, and, as shown in photograph of FIG. 5C, the remaining edge portions 622, the centers of which are located at alternate positions, among 16 split edge portions 620 and the center portion 610 are charged with the ceramic powder to a predetermined weight as described above. As shown in the right image of FIG. 6, the edge portions 621 may be placed at predetermined odd-numbered positions among positions at which the centers of the 16 split edge portions 620 are spaced 360°/16=22.5° apart from each other in the circumferential direction. The edge portions 622 at the remaining alternate positions may be placed at even-numbered positions of the centers of the 16 split edge portions 620.

Thus, in FIG. 4, after charging (S420) and leveling (S430) of the first ceramic powder 350" and formation (S440) of a molded body or pre-sintered body 350' thereof, the high-frequency electrode 360 and the heating element 380 are buried (or placed) in the ceramic materials 370' and 390', which are other ceramic powders, on the molded body or pre-sintered body 350' of the first ceramic powder 350", and are then integrally press-sintered (S450 to S490).

First, in operation S450, the high-frequency electrode 360 is disposed on the molded body or pre-sintered body 350' of the first ceramic powder 350" (S450). The high-frequency electrode 360 may be made of tungsten (W), molybdenum (Mo), silver (Ag), gold (Au), niobium (Nb), titanium (Ti), aluminum nitride (AlN), or an alloy thereof, and may preferably be made of molybdenum (Mo). The high-frequency electrode 360 is an electrode layer for plasma enhanced chemical vapor deposition, and may be selectively connected to an RF power source (radio power source) or a ground through a connection rod (see reference numeral 710 in FIGS. 7A, 7B, and 7C). The high-frequency electrode 360 has a wire-type or sheet-type mesh structure. The mesh structure is a net-shaped structure formed by making multiple metals arranged in a first direction alternately cross multiple metals arranged in a second direction.

After the high-frequency electrode 360 is disposed (S450), a second ceramic powder 370' (an electrode-on first ceramic powder) is charged onto the high-frequency electrode (S460). The charging of the second ceramic powder 370' may be performed through one jig hole by a typical method without distinguishing between the center portion 610 and the multiple split edge portions 620, or, as in operation S420, may be performed using a jig having holes corresponding to the center portion 610 and the multiple split edge portions 620.

Meanwhile, charging of the second ceramic powder 370' (S460) is performed using a jig having holes corresponding to the center portion 610 and the multiple split edge portions 620, as in operation S420, and thus the heating element 380 can be formed to have a flat(-shaped) cross-section, a downwardly convex (V/U-shaped) cross-section, or an upwardly convex (reverse V/U-shaped) cross-section. Herein, the high-frequency electrode 360 may also have a flat(-shaped) cross-section, a downwardly convex (V/U-shaped) cross-section, or an upwardly convex (reverse V/U-shaped) cross-section. Therefore, at least one of the high-frequency electrode 360 and the heating element 380 may be formed to have a flat(-shaped) cross-section (see FIG. 7A), a downwardly convex (V/U-shaped) cross-section (see FIG. 7B), or an upwardly convex (reverse V/U-shaped) cross-section (see FIG. 7C). Accordingly, both the heating element 380 and the high-frequency electrode 360 may be formed to have a flat(-shaped) cross-section, a downwardly convex (V/U-shaped) cross-section, or an upwardly convex (reverse V/U-shaped) cross-section, or the heating element 380 may be formed to have a flat shaped) cross-section but the high-frequency electrode 360 may be formed to have a downwardly convex (V/U-shaped) cross-section or an upwardly convex (reverse V/U-shaped) cross-section.

After charging of the second ceramic powder 370', the heating element 380 is disposed thereon (S470). The heating element 380 may be formed in a flat plate shape or a plate coil shape including a heating coil (or resistance coil). Further, the heating element 380 may be formed in a multilayer structure in order to precisely control the temperature thereof. In the semiconductor manufacturing process, the heating element 380 is connected to a power source through a connection rod (see reference numeral 720 FIGS. 7A, 7B, and 7C) to heat an object, which is to be heat-treated and is placed on the top surface of a ceramic heater, to a predetermined temperature in order to smoothly perform a deposition process and an etching process.

After the heating element 380 is disposed (S470), a third ceramic powder 390' (an electrode-on second ceramic powder) is charged onto the heating element 380 (S460). Herein, charging of the third ceramic powder 390' may be performed through one jig hole by a typical method without any distinction between the center portion 610 and the multiple split edge portions 620, or, as in operation S420, may be performed using a jig having holes corresponding to the center portion 610 and the multiple split edge portions 620.

After charging of the third ceramic powder 390', press sintering is performed (S490). At this time, in the state in which the high-frequency electrode 360 and the heating element 380 are buried (or placed), a predetermined pressure is applied to the molded body or pre-sintered body 350' of the first ceramic powder 350", the second ceramic powder 370', and the third ceramic powder 390' by using the pressing mold 320, and simultaneously, high-temperature heat is provided thereto so as to sinter ceramic powder layers, thereby forming a body part of the ceramic heater of the present disclosure. In one example, during the press sintering, compression sintering may be performed at a temperature of about 1600 to 1950° C. and a pressure of about 0.01 to 0.3 t/cm² by the pressing mold 320. Thus, formation of the body part of the ceramic heater of the present disclosure, including a first ceramic sintered body 350, a second ceramic sintered body 370, and a first ceramic sintered body 390, which are sintered bodies of the first ceramic powder 350", the second ceramic powder 370', and the third ceramic powder 390', respectively, is completed.

Each of the first ceramic powder 350", the second ceramic powder 370', and the third ceramic powder 390', described in the present disclosure, may be at least one selected from among $Al_2O_3$, $Y_2O_3$, $Al_2O_3/Y_2O_3$, $ZrO_2$, autoclaved lightweight concrete (AlC), TiN, AlN, TiC, MgO, CaO, $CeO_2$, $TiO_2$, $B_xC_y$, BN, $SiO_2$, SiC, YAG, Mullite, and $AlF_3$, and may preferably be aluminum nitride (AlN). Furthermore, each ceramic powder may selectively contain an yttrium oxide powder in an amount of 0.1 to 10%, preferably, about 1 to 5%.

FIGS. 7A, 7B and 7C are cross-sectional views of ceramic heaters 1000/2000/3000 manufactured by a manufacturing method of the present disclosure.

Referring to FIGS. 7A to 7C, each of the ceramic heaters 1000/2000/3000 of the present disclosure includes a body part 490 and a support part 500.

The body part 490 is formed to have a structure in which the first ceramic sintered body 350, which is a sintered body of the first ceramic powder 350", is in contact with and integrated with the second ceramic sintered body 400 including the sintered bodies 370 and 390, which are sintered bodies of the second ceramic powder 370' and the third ceramic powder 390'. The body part 490 includes the high-frequency electrode 360 and the heating element 380, which are buried (or placed) in the second ceramic sintered body 400.

As described above, the first ceramic sintered body 350 and the second ceramic sintered body 400 are in contact with and integrated with each other by sintering a laminated structure including: an intermediate body (molded body or pre-sintered body) 350' of the first ceramic powder 350" for the first ceramic sintered body 350; and the ceramic powders 370' and 390' for the second ceramic sintered body 400. As described above, the intermediate body (molded body or pre-sintered body) 350' is formed by separately charging the first ceramic powder 350" for the first ceramic sintered body 350 into the center portion 610 and the multiple split edge portions 620 in the formation mold 310), leveling the first ceramic powder 350", and then pressing the first ceramic powder 350" by using the pressing mold 320.

The support part 500 may be formed of the same ceramic material as the body part 490, and may be coupled thereto. Herein, the ceramic material may be at least one among $Al_2O_3$, $Y_2O_3$, $Al_2O_3/Y_2O_3$, $ZrO_2$, Autoclaved Lightweight Concrete (AlC), TiN, AlN, TiC, MgO, CaO, $CeO_2$, $TiO_2$, $B_xC_y$, BN, $SiO_2$, SiC, YAG, Mullite, and $AlF_3$, and may preferably be Aluminum Nitride (AlN). In addition, each ceramic powder may selectively contain an yttrium oxide powder in an amount of 0.1 to 10%, preferably, about 1 to 5%.

The high-frequency electrode 360 is an electrode layer for plasma enhanced chemical vapor deposition, and may be selectively connected to an RF power source (radio power source) or a ground through a connection rod (see reference numeral 710). In the semiconductor manufacturing process, the heating element 380 may be connected to a power source through a connection rod (reference numeral 720) to heat an object, which is to be heat-treated and is placed on the top surface of the ceramic heater, to a predetermined temperature in order to smoothly perform a deposition process and an etching process.

In the ceramic heater 1000 in the embodiment of FIG. 7A, both the high-frequency electrode 360 and the heating element 380 have a flat (-shaped) cross-section.

In the ceramic heater 2000 in the embodiment of FIG. 7B, the heating element 380 has a flat cross-section and the high-frequency electrode 360 has a downwardly convex (V/U-shaped) cross-section.

In the ceramic heater 3000 in the embodiment of FIG. 7C, the heating element 380 has a flat cross-section and the high-frequency electrode 360 has an upwardly convex (reverse V/U-shaped) cross-section.

The above-described cross-sectional shapes of the high-frequency electrode 360 may be made by predetermining the first weight, to which, in operation S420, the first ceramic powder 350" is charged into the center portion 610, and the second weight, to which the first ceramic powder 350" is charged into the multiple split edge portions 620, such that there is a predetermined difference therebetween and applying the same.

[Table 1] below shows examples of implementing the weight of the first ceramic powder 350" charged into the center portion 610, the weight of the first ceramic powder 350" charged into the multiple split edge portions 620, and the relationship between the weights and the cross-sectional shape of the high-frequency electrode 360. Herein, the case in which the multiple split edge portions 620 include eight split portions is shown. In [Table 1], the split edge portion weight indicates, when the multiple split edge portions 620 are eight split portions, "the amount of powder charged into each split portion *8".

TABLE 1

| CENTER PORTION WEIGHT (A) | SPLIT EDGE PORTION WEIGHT (B) | POWDER RATIO (A:B) | CROSS-SECTIONAL SHAPE OF HIGH-FREQUENCY ELECTRODE |
|---|---|---|---|
| 100 g | 145 g * 8 | 1:11.5 | |
| 100 g | 125 g * 8 | 1:10.1 | |
| 100 g | 75 g * 8 | 1:6.1 | |
| 100 g | 70 g * 8 | 1:5.7 | |
| 100 g | 65 g * 8 | 1:5.3 | |

It was found that the high-frequency electrode 360 had an excellent flat cross-sectional shape (a - shape) when the ratio (A:B) of the weight (A) of the powder charged into the center portion 610 to the weight (B) of the powder charged into the multiple split edge portions 620 was 1:6.0 to 1:9.5 (preferably, 1:6.7 to 1:9.0), and had the flattest cross-sectional shape when the ratio (A:B) was 1:8.1. However, it is to be made clear that the above-described charging ratio (A:B) may change slightly depending on conditions such as pressure and temperature during compression sintering. Further, the charging ratio (A:B) may be determined such that the cross-sectional shape of the high-frequency electrode 360 is a downwardly convex cross-sectional shape (a V/U shape) or an upwardly convex cross-sectional shape (a reverse V/U shape). For example, if the weight (B) of the powder charged into the multiple split edge portions 620 is smaller than that in the case in which the charging ratio (A:B) is 1:6.0 (preferably, 1:6.7), the high-frequency electrode 360 may be manufactured to have a downwardly convex cross-sectional shape (a V/U shape). If the weight (B) of the powder charged into the multiple split edge portions 620 is larger than that in the case in which the charging ratio (A:B) is 1:9.5 (preferably, 1:9.0), the high-frequency electrode 360 may be manufactured to have an upwardly convex cross-sectional shape (a reverse V/U shape). However, in order for the cross-sectional shape of the high-frequency electrode 360 to be a flat cross-sectional shape (a - shape), a downwardly convex cross-sectional shape (a V/U shape), or an upwardly convex cross-sectional shape (a reverse V/U shape), the charging ratio (A:B) may differ for each of the respective shapes, but there is no change in the sum of the weight (A) of the powder charged into the center portion 610 and the weight (B) of powder charged into the multiple split edge portions 620.

In addition, at the time of charging of the second ceramic powder 370' in operation S460 in FIG. 4, as in operation S420, the second ceramic powder 370' is separately charged into the center portion 610 and the multiple split edge portions 620 in the formation mold 310 so as to allow the heating element 380 to have a flat cross-sectional shape (a - shape), a downwardly convex cross-sectional shape (a V/U shape), or an upwardly convex cross-sectional shape (a reverse V/U shape). As shown in [Table 1], the charging ratio (A:B) may be determined to allow the cross-sectional shape of the heating element 380 to be a flat cross-sectional shape (a - shape), a downwardly convex cross-sectional shape (a V/U shape), or an upwardly convex cross-sectional shape (a reverse V/U-shape. Therefore, at least one of the high-frequency electrode 360 and the heating element 380 can be formed to have a flat cross-sectional shape (a - shape) (see FIG. 7A), a downwardly convex cross-sectional shape (a V/U shape) (see FIG. 7B), or an upwardly convex cross-sectional shape (a reverse V/U-shape) (see FIG. 7C).

As described above, through a number of experiments regarding the present disclosure, it was determined that the high-frequency electrode 360 or the heating element 380 may be implemented so as to have a flat cross-sectional shape (a - shape), a downwardly convex cross-sectional shape (a V/U shape), or an upwardly convex cross-sectional shape (a reverse V/U shape) by separately charging a ceramic powder. Further, it was determined that, if necessary, the heating element 380 may be implemented so as to have a flat cross-sectional shape (a - shape), but the high-frequency electrode 360 may be implemented so as to have a downwardly convex cross-sectional shape (a V/U shape) or an upwardly convex cross-sectional shape (a reverse V/U-shape). This is because the uniformity of the filling density of a ceramic powder was improved.

Figure 8:
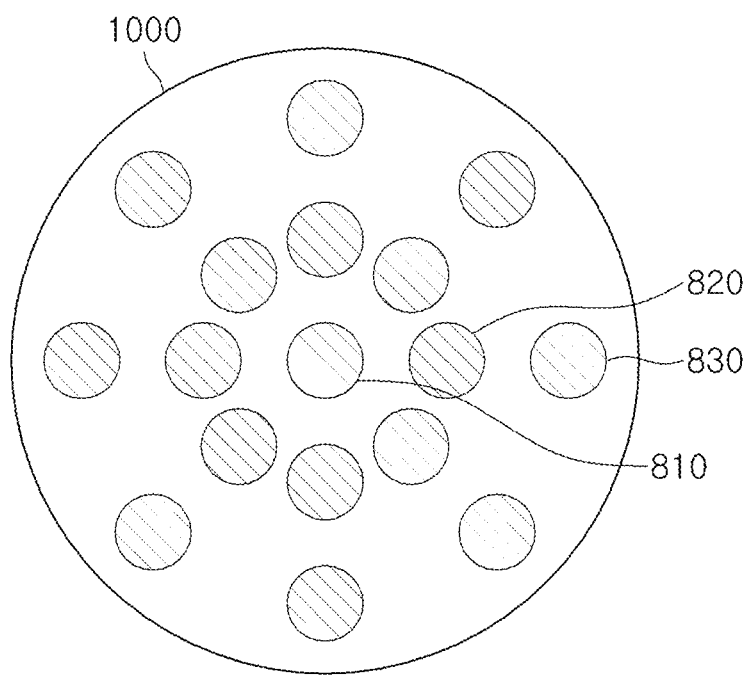
FIG. 8 is a view for describing parameter measurement positions of a ceramic heater manufactured by a manufacturing method of the present disclosure.

Meanwhile, [Table 2] shows the upper dielectric thickness (UDT) deviation (the distance between the high-frequency electrode 360 and surface) of a ceramic heater manufactured according to the number of the multiple split edge portions 620 when the cross-sectional shape of the high-frequency electrode 360 is designed as a flat cross-sectional shape (a - shape). Here, the result of an implementation example in the case in which the diameter of the ceramic heater 1000 is 30 cm is shown. As illustrated in FIG. 8, the UDT deviation indicates the difference between a minimum value and a maximum value among all measurement values at a center measurement point 810 (e.g., one point), edge measurement points 830 (e.g., eight points) spaced a predetermined distance apart from the center, and middle measurement points (820) (e.g., eight points) predesignated between the center measurement point 810 and the edge measurement points 830.

TABLE 2

| Number of split edge portions 620 | UDT Deviation (mm) |
| --- | --- |
| Prior Art (0) | 0.31 |
| 4 | 0.53 |
| 8 | 0.23 |
| 16 | 0.20 |

In the case of the prior art, ceramic powder is charged through one central jig hole in the state in which there is no split edge portion, and UDT was 0.31 mm, as shown in [Table 2]. In contrast, it was found that, in the present disclosure, as the number of separate split portions of the multiple split edge portions 620 increases, the resultant UDT was better than that in the case of the prior art.

Figure 9A:
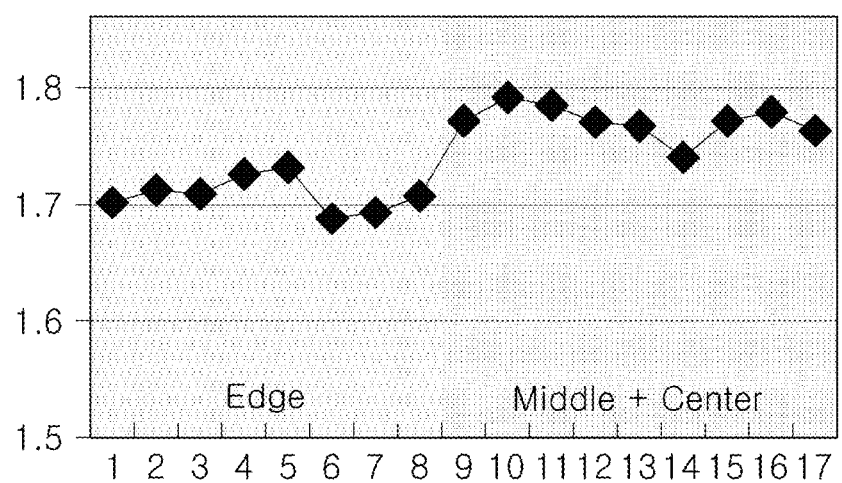
FIG. 9A illustrates graphs showing a result of measurement of a position-specific density ($g/cm^3$) distribution of a conventional ceramic heater

FIG. 9A illustrates graphs showing a result (graph of measurement of a position-specific density ($g/cm^3$)) distribution of a conventional ceramic heater.

Figure 9B:
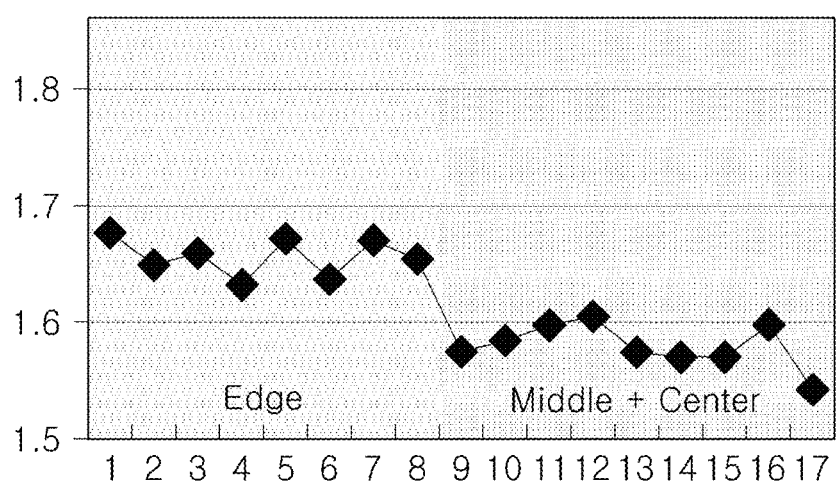
FIGS. 9B and 9C illustrates graphs showing results of measurement of position-specific density ($g/cm^3$) distribution of a ceramic heater manufactured by the manufacturing method of the present disclosure.
Figure 9C:
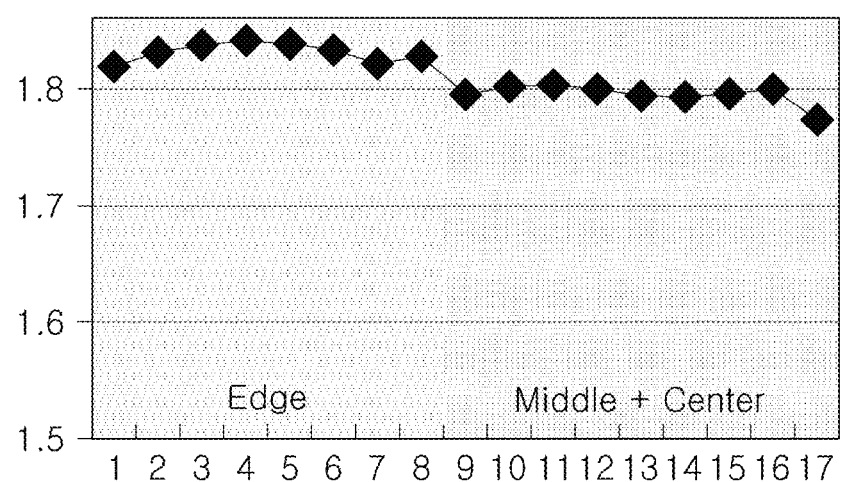

FIGS. 9B and 9C illustrates graphs showing results (graphs of measurement of position-specific density ($g/cm^3$)) distributions of a ceramic heater manufactured by a manufacturing method of the present disclosure. In the case of graph of FIG. 9B, the number of split portions of the multiple split edge portions 620 is 4 and, in the case of graph of FIG. 9C, the number of the multiple split edge portions 620 is 8. In FIGS. 9A, 9B and 9C, measurement position numbers 1 to 8 on the horizontal-axis indicate the eight edge measurement points 830 in FIG. 8, measurement position numbers 9 to 16 indicate the eight middle measurement points 820 in FIG. 8, and measurement position number 17 indicates the center measurement point 810.

In the case of the prior art (graph in FIG. 9A), ceramic powder is charged through one central jig hole in the state in which there is no split edge portion, and it was found that the uniformity is similar to that in the case in which the multiple split edge portions 620 of the present disclosure are four split edge portions. Further, it could be known that, when the multiple split edge portions 620 of the present disclosure are eight split edge portions, the uniformity was increased much more than in other cases. The density distribution has a tendency similar to that of the UDT deviation, and may thus be used as data to allow the UDT deviation to be predicted.

As described above, in the manufacturing method for the ceramic heaters 1000/2000/3000 according to the present disclosure, it is possible to separately charge and then press-sintering a ceramic powder at the time of forming a molded body or pre-sintered body (350') in the formation mold 310 for heater manufacturing to improve the uniformity of filling density depending on the position, thereby preventing a high-frequency electrode from being bent. Further, the heaters can be manufactured such that, even when a high-frequency electrode is required to have a flat shape (a - shape), a downwardly convex shape (a V/U shape), or an upwardly convex shape (a reverse V/U shape), like a heating element, for a design purpose, a ceramic powder is charged, at the time of forming a molded body or pre-sintered body, into a center portion and split edge portions (e.g., an edge portion is split into 4, 8, or 16 equal portions) to make ceramic powder filling densities different, and thus the high-frequency electrode having the corresponding shape is easily provided. The above-described method for manufacturing the ceramic heaters 1000/2000/3000 enables the shape of the high-frequency electrode 360 to be easily designed and manufactured without precise processing when forming a molded body (or a pre-sintered body) disposed below the high-frequency electrode 360 in the formation mold 310. Further, in forming the heating element 380, a flat shape (a - shape), a downwardly convex shape (a V/U shape), or an upwardly convex shape (a reverse V/U shape) thereof can also be easily realized by applying the method for forming the high-frequency electrode 360 thereof.

Although the present disclosure has been described above on the basis of limitative embodiments and drawings and in conjunction with specific matters such as particular elements, these have been presented merely to help the comprehensive understanding of the present disclosure. The present disclosure is not limited by these embodiments, and those skilled in the art may make various modifications and changes thereto without departing from the essential features of the present disclosure. Therefore, the spirit of the present disclosure should not be defined only by the described embodiments (prior research, etc.), and the scope of the present disclosure should be construed to include all technical ideas defined by the appended claims and equivalents thereof.

What is claimed is:

1. A method for manufacturing a ceramic heater, comprising:
    (a) separately charging a ceramic powder into a center portion and multiple split edge portions in a formation mold and leveling the charged ceramic powder, wherein the center portion is in direct contact with the multiple split edge portions, each of the multiple split edge portions are in direct contact with an adjacent one of the multiple split edge portions, and the ceramic powder is distributed across and over the center portion and the multiple split edge portions;
    (b) forming a molded body or pre-sintered body of the ceramic powder from the leveled ceramic powder;
    (c) disposing an electrode or a heating element on the molded body or pre-sintered body of the ceramic powder and filling a second ceramic powder; and
    (d) integrally sintering the molded body or pre-sintered body of the ceramic powder and the second ceramic powder.

2. The method of claim 1, wherein the center portion is a region having a predetermined radius from a center point, and the multiple split edge portions comprise four or more split edge portions disposed on a circumference which is in contact with the center portion.

3. The method of claim 1, wherein the operation (a) is repeated, and a powder-charging position of each of the multiple split edge portions is a position resulting from rotation about the center portion by a predetermined angle.

4. The method of claim 1, wherein the operation (a) comprises charging the center portion with the ceramic powder to a first weight and then charging each of the multiple split edge portions with the ceramic powder to a second weight.

5. The method of claim 4, wherein the first weight and the second weight are predetermined in order to form a flat cross-section or an upwardly or downwardly convex cross-section of the electrode disposed in the second ceramic powder on the molded body or pre-sintered body of the ceramic powder in the ceramic heater.

6. The method of claim 1, wherein the operation (a) comprises charging each of the multiple split edge portions with the ceramic powder to a second weight and then charging the center portion with the ceramic powder to a first weight.

7. The method of claim 6, wherein the first weight and the second weight are predetermined in order to form a flat cross-section or an upwardly or downwardly convex cross-section of the electrode disposed in the second ceramic powder on the molded body or pre-sintered body of the ceramic powder in the ceramic heater.

8. The method of claim 1, wherein the operation (c) comprises:
    disposing the electrode on the molded body or pre-sintered body of the ceramic powder;
    charging an electrode-on first ceramic powder of the second ceramic powder onto the electrode;
    disposing the heating element on the electrode-on first ceramic powder charged on the electrode;
    charging an electrode-on second ceramic powder of the second ceramic powder onto the heating element; and
    performing press sintering.

9. The method of claim 8, wherein the charging of the electrode-on second ceramic powder comprises separately charging the center portion and the multiple split edge portions in the formation mold with the electrode-on second ceramic powder in order to form a flat cross-section or an upwardly or downwardly convex cross-section of the heating element in the ceramic heater.

* * * * *